US011175122B2

(12) United States Patent
Tsay et al.

(10) Patent No.: US 11,175,122 B2
(45) Date of Patent: Nov. 16, 2021

(54) AUTOMATIC NUT INTERNAL THREAD QUALITY TESTER

(71) Applicant: National Sun Yat-sen University, Kaohsiung (TW)

(72) Inventors: Der-Min Tsay, Kaohsiung (TW); Guan-shyong Hwang, Kaohsiung (TW); Tsung-Chun Lin, Kaohsiung (TW); Ming-Chao Hwang, Kaohsiung (TW)

( * ) Notice: Subject to any disclaimer, the term of this patent is extended or adjusted under 35 U.S.C. 154(b) by 0 days.

(21) Appl. No.: 16/908,769

(22) Filed: Jun. 23, 2020

(65) Prior Publication Data

US 2021/0239446 A1 Aug. 5, 2021

(30) Foreign Application Priority Data

Feb. 3, 2020 (TW) ................................ 109103230

(51) Int. Cl.
*G01B 3/48* (2006.01)
*G01B 5/00* (2006.01)

(52) U.S. Cl.
CPC ............ *G01B 3/48* (2013.01); *G01B 5/0002* (2013.01)

(58) Field of Classification Search
CPC ................................ G01B 3/48; G01B 5/0002
USPC ........................................................ 33/199 R
See application file for complete search history.

(56) References Cited

U.S. PATENT DOCUMENTS

| | | | | |
|---|---|---|---|---|
| 7,661,196 B1 * | 2/2010 | Kipnes | G01B 3/48 | 33/199 R |
| 7,941,932 B2 * | 5/2011 | Kipnes | G01B 3/48 | 33/199 R |
| 2008/0028623 A1 * | 2/2008 | Lange | G01B 3/48 | 33/199 R |
| 2010/0186242 A1 * | 7/2010 | Kipnes | G01B 3/48 | 33/199 R |
| 2015/0204642 A1 * | 7/2015 | DeYaeger | G01B 3/48 | 33/199 R |
| 2019/0178766 A1 * | 6/2019 | Jiang | G01N 3/42 | |
| 2021/0239446 A1 * | 8/2021 | Tsay | G01B 3/48 | |

FOREIGN PATENT DOCUMENTS

| | | |
|---|---|---|
| CN | 103743305 A | 4/2014 |
| CN | 103411721 B | 1/2015 |
| CN | 204286667 U | 4/2015 |
| CN | 208805129 U | 4/2019 |

* cited by examiner

*Primary Examiner* — Yaritza Guadalupe-McCall

(57) ABSTRACT

An automatic nut internal thread quality tester is provided. The automatic nut internal thread quality tester includes a blanking module, a clamping module, a push rod module, a thread gauge driving module, and an axial pushing module. The blanking module is configured to control the nuts to be tested be blanked in series. The clamping module is configured to clamp the to-be-tested nut. The push rod module is configured to push the to-be-tested nut into the clamping module and restrict the blanking. A thread gauge of the thread gauge driving module is driven by a motor to detect the to-be-tested nut. When a torque measured by a torque sensor is greater than a threshold value, the motor reverses the thread gauge and the axial pushing module drives the clamping module away from the thread gauge.

10 Claims, 7 Drawing Sheets

10 420 400 430 411 410 100 200 300 520 320 310 P2 P1 530 500 510

AUTOMATIC NUT INTERNAL THREAD QUALITY TESTER

CROSS REFERENCE TO RELATED APPLICATIONS

This application claims the priority of Taiwan Patent Application No. 109103230, filed on Feb. 3, 2020, titled "AUTOMATIC NUT INTERNAL THREAD QUALITY TESTER", and the disclosure of which is incorporated herein by reference.

FIELD OF INVENTION

The present disclosure relates to the field of thread quality tester, and more particularly, to an automatic nut internal thread quality tester.

BACKGROUND OF INVENTION

Because the position of the nut internal thread is complicated, the manpower and the thread gauge are needed for the existing nut thread testing equipment to spot-check the nuts. That is, the nut is manually screwed into the thread gauge, and the quality of the internal thread is determined by the number of turns. Thus, an automatic nut thread testing still cannot be achieved by the existing nut thread testing equipment. In addition, because the nut is screwed into the thread gauge by an inspector, the slight difference caused by the force which is exerted by the inspector may result in a slight testing error. Thus, a digital classification and digital control for all nuts cannot be achieved by the existing nut thread testing equipment.

Therefore, it is necessary to provide an automatic nut internal thread quality tester to solve the problems of the prior art.

SUMMARY OF INVENTION

The object of the present disclosure is to provide an automatic nut internal thread quality tester, which automatically rotates a thread gauge and measures the torque value to which the thread gauge is subjected. The quality of the internal thread is determined through the torque value and the number of turns.

In order to achieve the aforementioned object of the present disclosure, the present disclosure provides an automatic nut internal thread quality tester, including: a blanking module configured to accommodate at least one to-be-tested nut; a clamping module disposed on a side of the blanking module and configured to hold the to-be-tested nut; a push rod module disposed on another side of the blanking module and configured to push the to-be-tested nut into the clamping module; a thread gauge driving module disposed opposite the clamping module, wherein the thread gauge driving module includes a thread gauge, a motor, and a torque sensor, the thread gauge is toward the clamping module, the motor drives the thread gauge to rotate in a first direction, and the torque sensor measures a torque experienced by the thread gauge; and an axial pushing module configured to drive the clamping module, wherein the clamping module is driven to be moved toward the thread gauge, in order to make the thread gauge to detect an internal thread of the to-be-tested nut; wherein in response to a torque measured by the torque sensor being greater than a threshold value, the motor is paused and then the motor drives the thread gauge to rotate in a second direction, and the axial pushing module drives the clamping module away from the thread gauge.

In one embodiment, of the present disclosure, the clamping module includes: an alignment plate having a cavity, wherein the cavity matches the shape of the to-be-tested nut to accommodate and hold the to-be-tested nut; and a sliding rail disposed on the alignment plate and configured to guide the to-be-tested nut from the blanking module into the cavity.

In one embodiment of the present disclosure, the clamping module further includes a unidirectional retaining clip disposed between the cavity and the sliding rail, and the unidirectional retaining clip is configured to restrict the to-be-tested nut already in the cavity from moving toward the sliding rail.

In one embodiment of the present disclosure, the unidirectional retaining clip includes two guiding blocks disposed oppositely, each of the guiding blocks is connected to a spring, and the two guiding blocks only allow the to-be-tested nut enter the cavity.

In one embodiment of the present disclosure, the clamping module includes an alignment spring disposed on the alignment plate, and the alignment spring is configured to finely adjust the alignment plate, to guide the to-be-tested nut into the thread gauge.

In one embodiment of the present disclosure, the push rod module includes a push rod driver and a stick, the push rod driver drives the stick, and then the stick pushes the to-be-tested nut into the cavity along the sliding rail.

In one embodiment of the present disclosure, the axial pushing module drives the clamping module to move between a first position and a second position, the push rod module pushes the to-be-tested nut into the clamping module in response to the clamping module being at the first position, and the thread gauge detects the internal thread of the to-be-tested nut in response to the clamping module being at the second position.

In one embodiment of the present disclosure, the axial pushing module includes a stepping motor and a lead screw, the stepping motor drives the lead screw, and then the lead screw drives the clamping module to move between the first position and the second position.

In one embodiment of the present disclosure, after a detection of the to-be-tested nut, the push rod module pushes another to-be-tested nut into the clamping module in response to the clamping module returning to the first position, such that another to-be-tested nut pushes off the to-be-tested nut finishing the detection.

In one embodiment of the present disclosure, the push rod driver is an electric cylinder, a hydraulic cylinder or a pneumatic cylinder.

In one embodiment of the present disclosure, the thread gauge driving module uses a high-precision sleeve, a tapered sleeve, a three-jaw or a hydraulic jaw to rigidly clamp the thread gauge.

As described above, the thread gauge driving module rotates the thread gauge and measures the torque experienced by the thread gauge, and the axial pushing module cooperates with the clamping module to move the to-be-tested nut, thereby performing a test. When the torque is greater than a threshold value, the thread gauge driving module stops rotating the thread gauge and then reverses to separate the to-be-tested nut from the thread gauge, thereby avoiding the error caused by the difference in the exerted force. In addition, due to the cooperation of the blanking module, the clamping module and the push module, the feeding and discharging of the nut can be automatically completed.

DESCRIPTION OF DRAWINGS

In order to make the above content of the present disclosure more comprehensible, the preferred embodiments are described as follows in detail with the accompanying drawings.

DETAILED DESCRIPTION OF PREFERRED EMBODIMENTS

In the following detailed description of the preferred embodiments, reference is made to the accompanying drawings which form a part hereof, and in which is shown by way of illustrating specific embodiments in which the disclosure may be practiced. In this regard, directional terminology, such as "top", "bottom", "front", "back", "left", "right", "inside", "outside", "side", etc., is used with reference to the orientation of the figure(s) being described. As such, the directional terminology is used for purposes of illustration and is in no way limiting.

Figure 1:
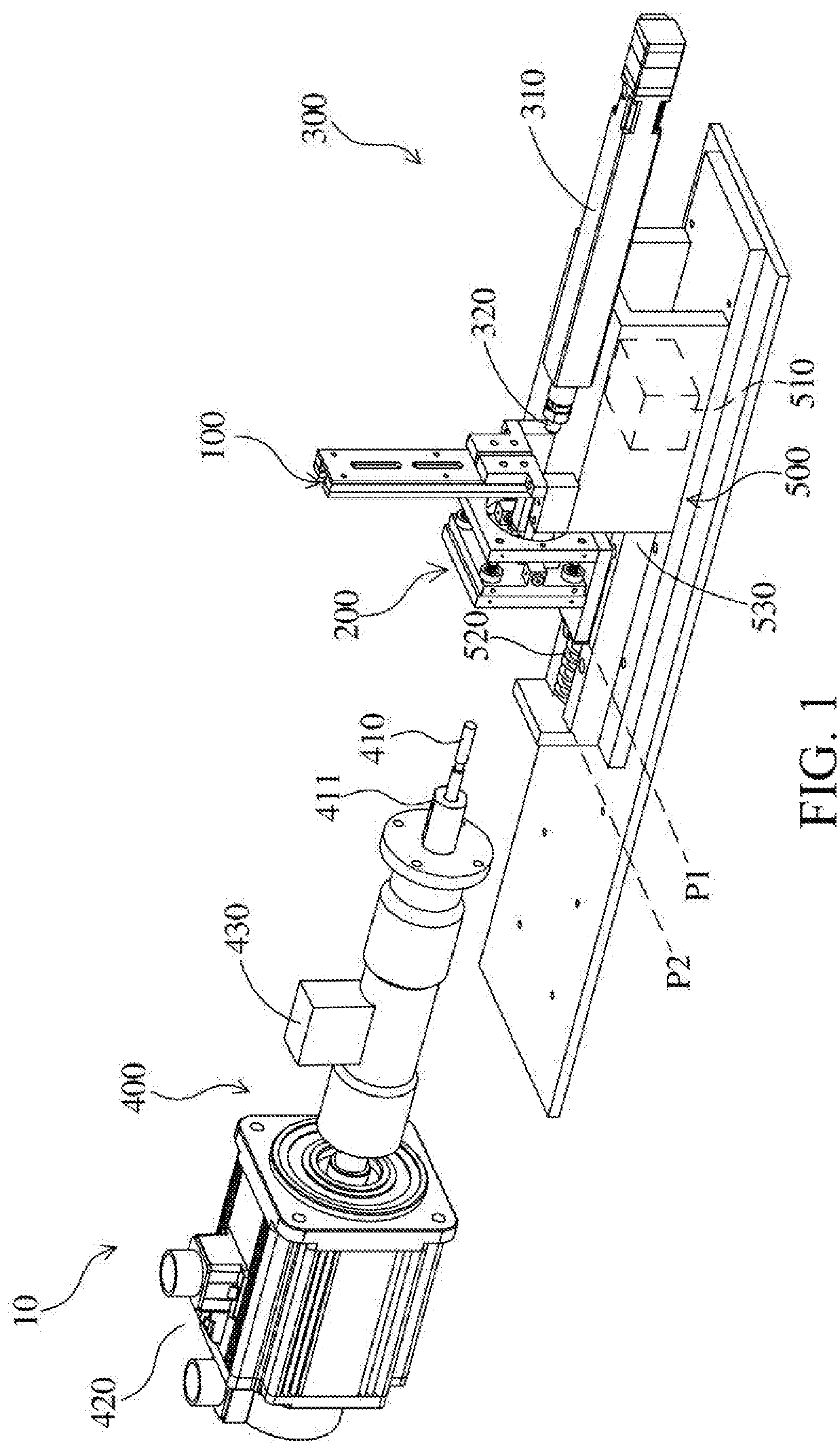
FIG. 1 is a schematic perspective view of an automatic nut internal thread quality tester according an embodiment of the present disclosure.
Figure 2:
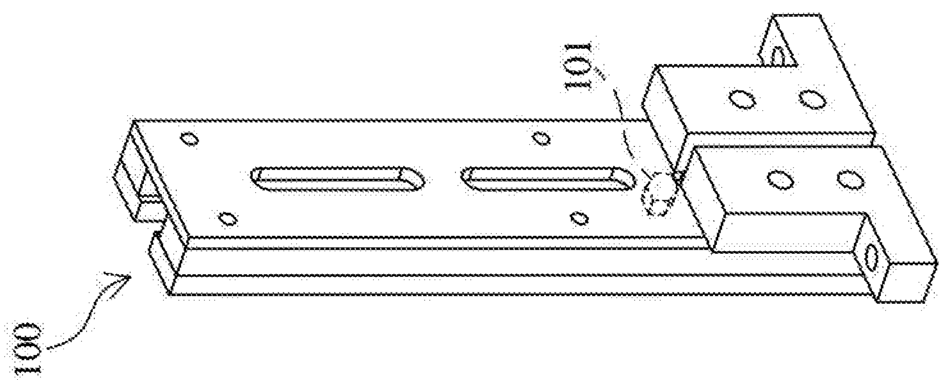
FIG. 2 is a schematic perspective view of a blanking module of the embodiment in FIG. 1.
Figure 3:
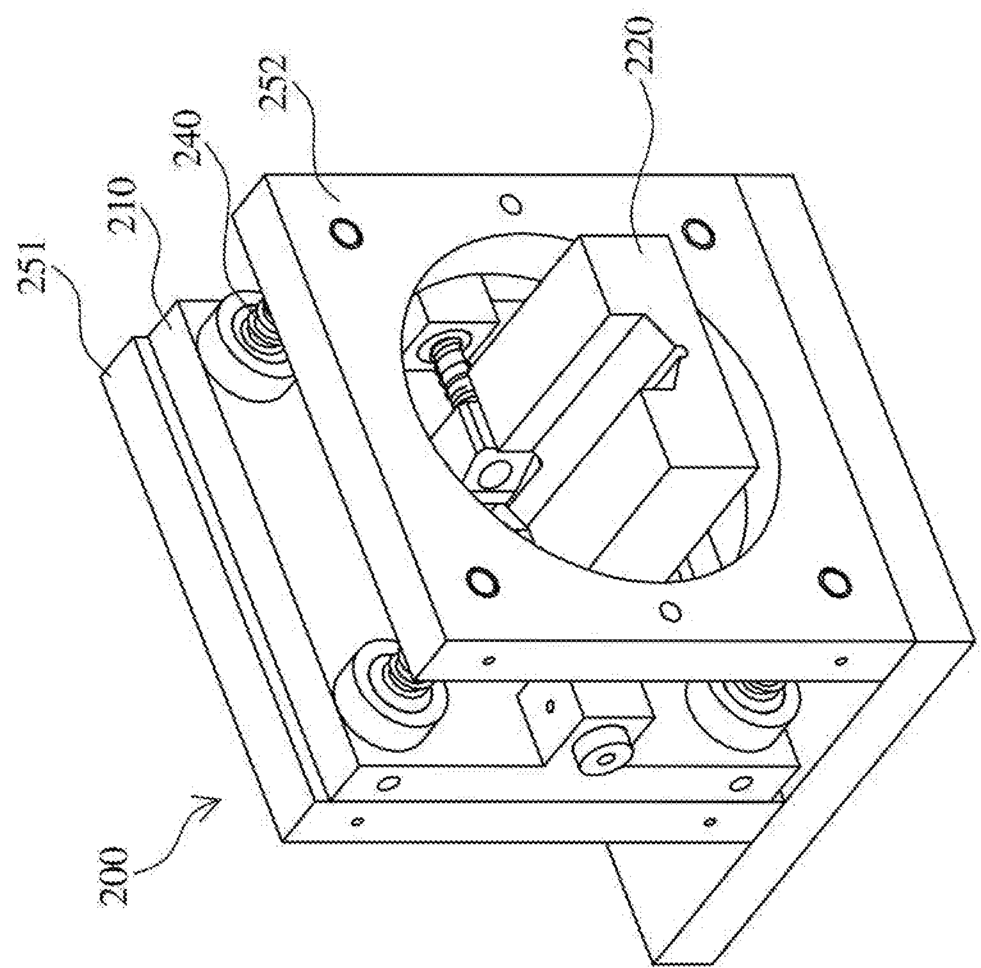
FIG. 3 is a schematic perspective view of a clamping module of the embodiment in FIG. 1.
Figure 4:
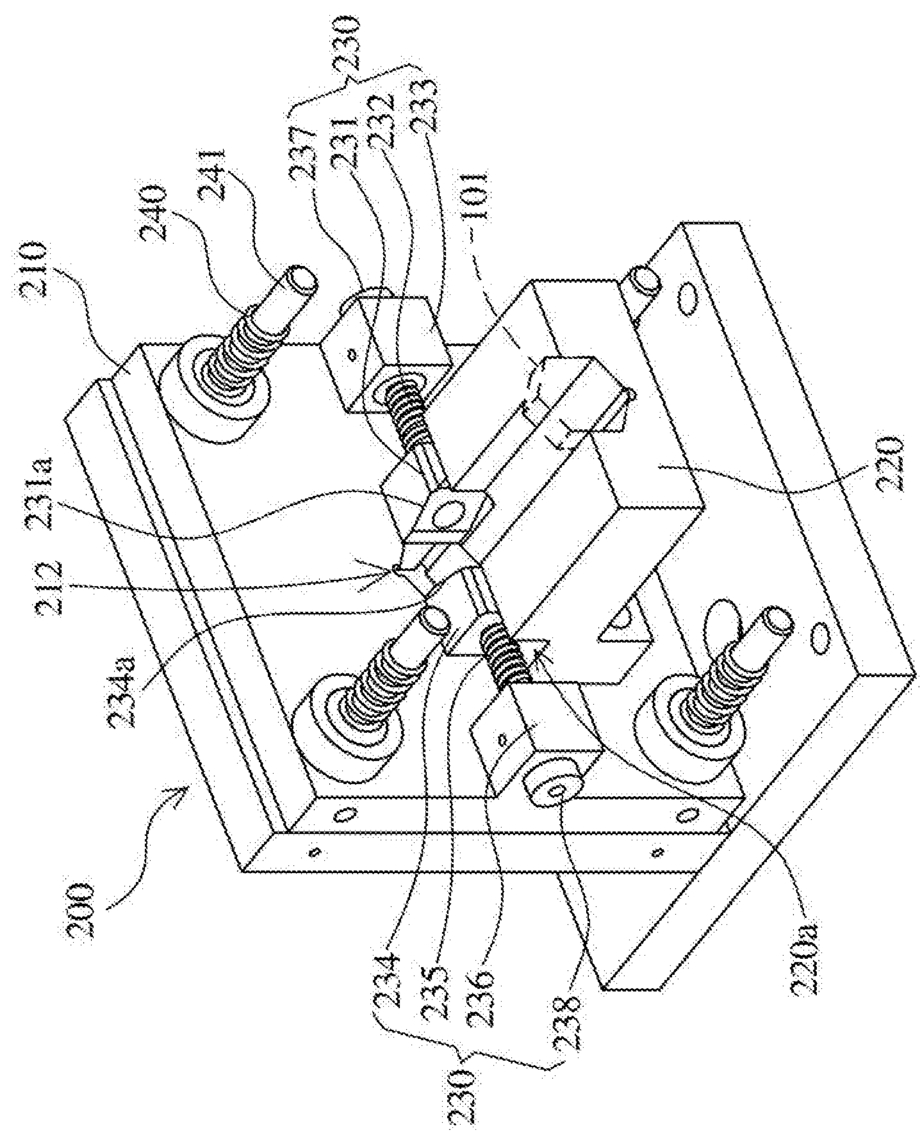
FIG. 4 is another schematic perspective view of the embodiment in FIG. 3 (a second against plate is not shown).
Figure 5B:
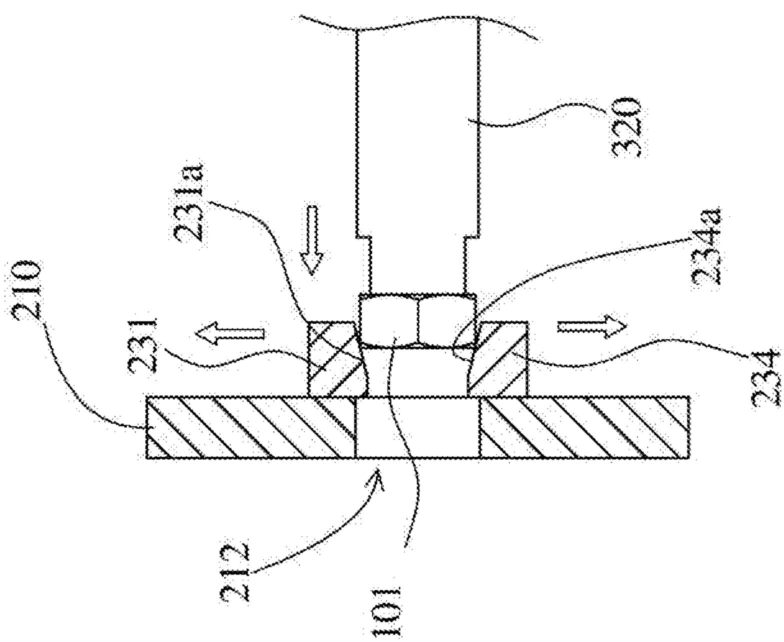
FIG. 5A to FIG. 5D are schematic diagrams showing the nut enters the cavity of the present disclosure.
Figure 5A:
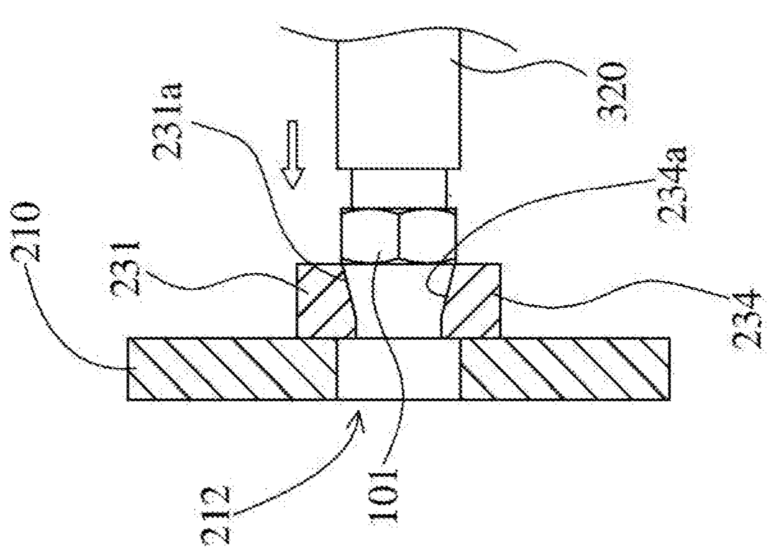
Figure 5D:
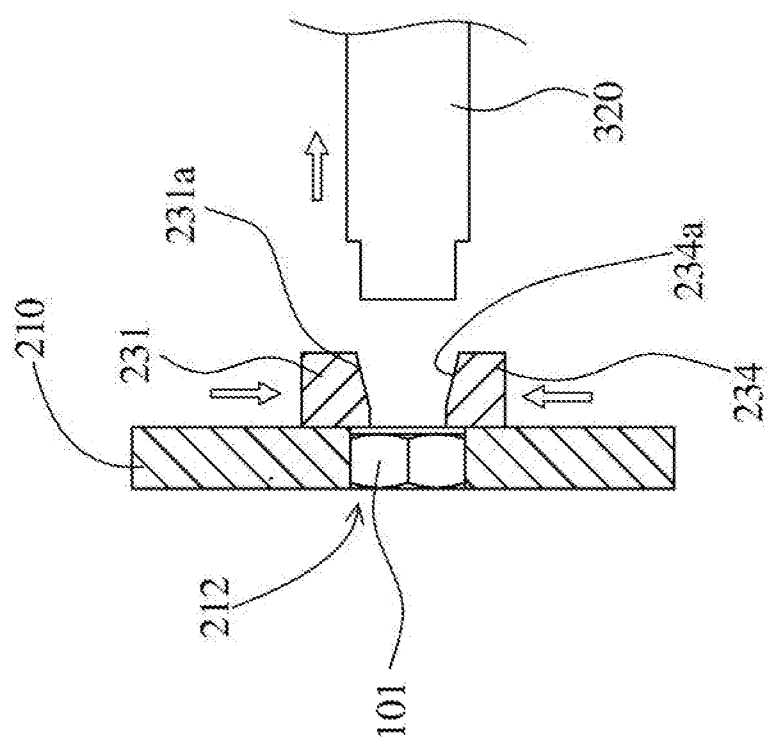
Figure 5C:
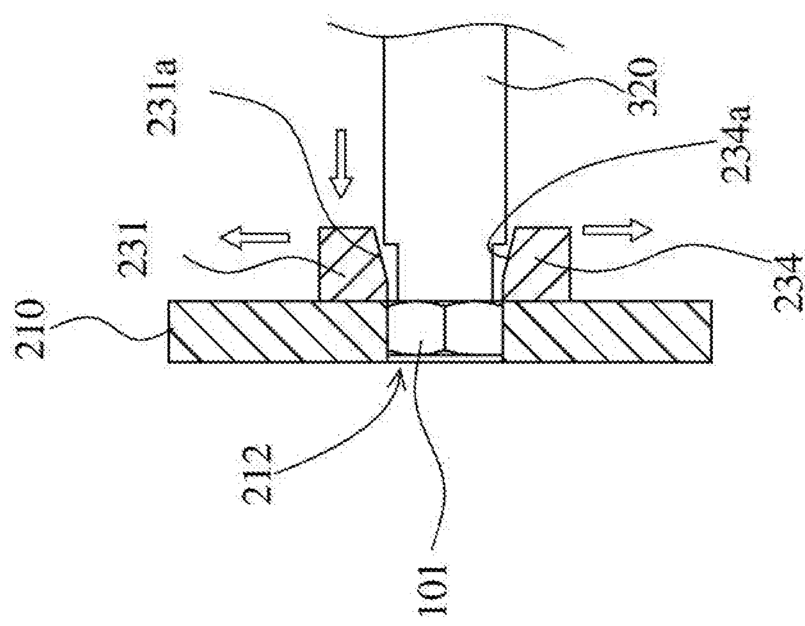
Figure 6:
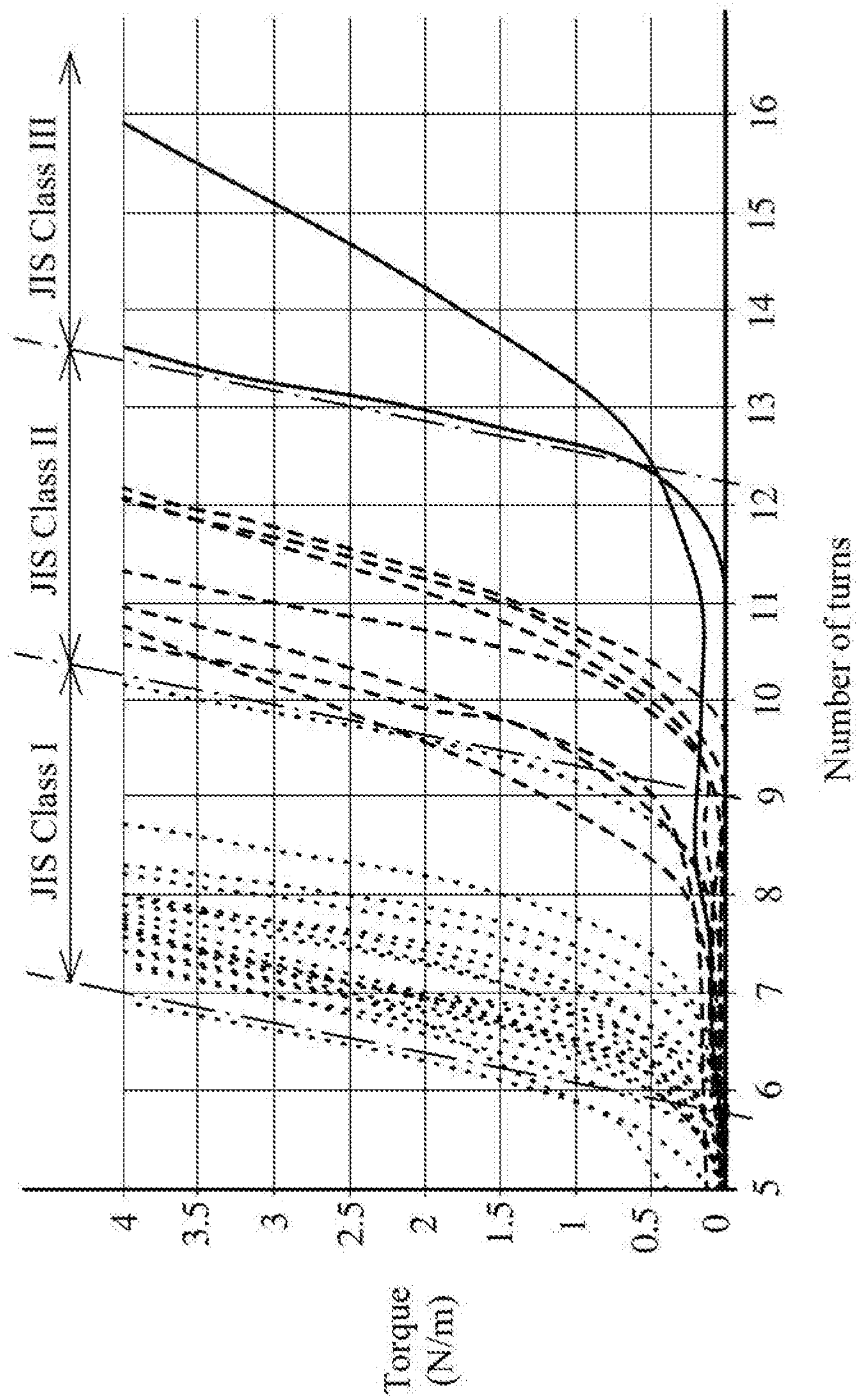
FIG. 6 is a test result of an automatic nut internal thread quality tester according to the embodiment of the present disclosure.

Please refer to FIG. 1 and FIG. 6. FIG. 1 is a schematic perspective view of an automatic nut internal thread quality tester according an embodiment of the present disclosure. FIG. 2 is a schematic perspective view of a blanking module of the embodiment in FIG. 1. FIG. 3 is a schematic perspective view of a clamping module of the embodiment in FIG. 1. FIG. 4 is another schematic perspective view of the embodiment in FIG. 3 (a second against plate is not shown). FIG. 5A to FIG. 5D are schematic diagrams showing the nut enters the cavity of the present disclosure. FIG. 6 is a test result of an automatic nut internal thread quality tester according to the embodiment of the present disclosure.

The present embodiment provides an automatic nut internal thread quality tester 10, including: a blanking module 100, a clamping module 200, a push rod module 300, a thread gauge driving module 400, and an axial pushing module 500.

The blanking module 100 is configured to accommodate at least one to-be-tested nut 101. (as shown in FIG. 2). Returning to FIG. 1, the clamping module 200 is disposed on a side of the blanking module 100 and is configured to hold the to-be-tested nut 101. The push rod module 300 is disposed on another side of the blanking module 100 and is configured to push the to-be-tested nut 101 into the clamping module 200. The thread gauge driving module 400 is disposed opposite the clamping module 200, wherein the thread gauge driving module 400 includes a thread gauge 410, a motor 420, and a torque sensor 430, the thread gauge 410 is toward the clamping module 200, the motor 420 drives the thread gauge 410 to rotate in a first direction, and the torque sensor 430 measures a torque experienced by the thread gauge 410. The axial pushing module 500 is configured to drive the clamping module 200, wherein the clamping module 200 is driven to be moved toward the thread gauge 410, in order to make the thread gauge 410 to detect an internal thread of the to-be-tested nut 101. When the torque measured by the torque sensor 430 is greater than a threshold value, the motor 420 is paused and then the motor 420 drives the thread gauge 410 to rotate in a second direction. Then the axial pushing module 500 reversely moves to drive the clamping module 200 to reversely move, and the thread gauge driving module 400 reversely rotates. The push rod module 300 goes back to blank the to-be-tested nut. In addition, the thread gauge driving module 400 uses a high-precision sleeve, a tapered sleeve, a three-jaw or a hydraulic jaw to rigidly clamp the thread gauge 410.

Please refer to FIG. 3 and FIG. 4. The clamping module 200 may include an alignment plate 210, a sliding rail 220, a unidirectional retaining clip 230, four alignment springs 240, a first against plate 251, and a second against plate 252. The alignment plate 210 has a cavity 210, wherein the cavity 212 matches the shape of the to-be-tested nut 101, to accommodate and hold the to-be-tested nut 101. The sliding rail 220 is disposed on the alignment plate 210 and is configured to guide the to-be-tested nut 101 from the blanking module 100 into the cavity 212. The unidirectional retaining clip 230 is disposed between the cavity 212 and the sliding rail 220, and the unidirectional retaining clip 230 is configured to restrict the to-be-tested nut already in the cavity 212 from moving toward the sliding rail 220. The unidirectional retaining clip 230 may include two guiding blocks 231, 234 disposed oppositely, each of the guiding blocks 231, 234 is connected to a spring 232, 235, and each of the springs 232, 235 is respectively connected to a fixed block 233, 236. Each of the fixed blocks 233, 236 may be fixedly disposed on the alignment plate 210, for example, integrally formed with the alignment plate 210. The sliding rail 200 may further have a sliding groove 220*a* for receiving each of the guiding blocks 231, 234, and each of the guiding blocks 231, 234 can move toward or away from each other in the sliding groove 220*a*. Each of fixed blocks 233, 236 may further be provided with a round shaft 237, 238. The round shafts 237, 238 cooperate with the springs 232, 235 and the guiding blocks 231, 234, such that the two guiding blocks 231, 234 can be guided by the round shafts 237, 238, and can be stably moved in the sliding groove 220*a*. In addition, each of the guiding blocks 231, 234 has a guiding surface 231*a*, 234*a*, and the guiding surface 231*a*, 234*a* is adjacent to the sliding rail 220. When the to-be-tested nut 101 is pushed toward the cavity 212 by the push rod module 300 and the guiding surfaces 231*a*, 234*a* of each of guiding blocks 231, 234 are contacted by the to-be-tested nut 101, each of the guiding surfaces 231*a*, 234*a* begins to slide open, thereby allowing the to-be-tested nut 101 to enter the cavity 212. When the to-be-tested nut 101 then enters the cavity 212, each of the guiding blocks 231, 234 returns to their original position due to the thrust from the springs 232, 235. In addition, each of the guiding blocks 231, 234 has an abutting surface (not labeled) to restrict the to-be-tested nut 101, which entered the cavity 212, from moving toward the sliding rail 220. In this way, the unidirectional retaining clip 230 only allows the to-be-tested nut 101 to enter the cavity 212.

As shown in FIG. 5A and FIG. 5B, when the to-be-tested nut 101 is pushed to contact the guiding surface 231*a* of the guiding block 231 and the guiding surface 234*a* of the guiding block 234 by the stick 320, the guiding block 231 and the guiding block 234 are pushed to move toward the left and right. The cone effect is configured to push away the guiding blocks 231, 234, such that the to-be-tested nut 101 keeps moving forward and into the cavity 212.

As shown in FIG. 5C and FIG. 5D, when the guiding blocks 231, 234 are pushed away to a certain distance, the to-be-tested nut 101 enters the cavity 212 for positioning. Then the stick 320 moves backward, and the guiding blocks 231, 234 return to their original position, thereby avoiding the to-be-tested nut 101 form moving backward.

Returning to FIG. 3 and FIG. 4, the four alignment springs 240 are disposed on the alignment plate 210, such as on the four corners of the alignment plate 210. The four alignment springs 240 cooperate with four slip shafts 241 to finely adjust the alignment plate 210, to guide the to-be-tested nut 101 into the thread gauge 410. As shown in FIG. 3 and FIG. 4, the alignment plate 210 is located between the first against plate 251 and the second against plate 252. The four alignment springs 240 contact the second against plate 252 and make the alignment plate 210 abut against the first against plate 251. The four alignment springs 240 slide along the respective slip shafts 241 without tilting. When the axial pushing module 500 pushes the clamping module 200 forward and the to-be-tested nut 101 contacts the thread gauge 410, if the starting point of the to-be-tested nut 101 and the starting point of the thread gauge 410 are not consistent, the alignment plate 210 can moves backward and compresses the four alignment springs 240. In this way, the four alignment springs 240 slides along the slip shafts 241, such that the alignment plate does not tilt. If the starting points thereof are consistent, the to-be-tested nut 101 enters the thread gauge 410. Because the to-be-tested nut 101 in the cavity 212 does not rotate, the to-be-tested nut 101 enters the thread gauge 410 though the thread of the thread gauge 410, thereby detecting the torque.

Specifically, during the detection of the to-be-tested nut, when the entry point (starting point) of the thread gauge 410 is aligned with the entry point (starting point) of the to-be-tested nut 101, the thread gauge 410 is allowed to rotate into the to-be-tested nut 101 for detecting. When the entry point of the thread gauge 410 is not aligned with the entry point of the to-be-tested nut 101, the alignment plate 210 can be appropriately and elastically moved between the first against plate 251 and the second against plate 252 by the cooperation of the alignment plate 210 with the alignment springs 240. That is, when the entry point of the thread gauge 410 is not aligned with the entry point of the to-be-tested nut 101, a slip occurs between the thread gauge 410 and the to-be-tested nut 101. Then, the force between the thread gauge 410 and the to-be-tested nut 101 compresses the alignment springs 240, such that the alignment plate 210 can be slightly and elastically moved between the first against plate 251 and the second against plate 252 in a direction opposite the thread gauge 410. When the thread gauge 410 is rotated and is aligned with the entry point of the to-be-tested nut 101, the thread gauge 410 is smoothly rotated into the to-be-tested nut. In addition, the minimum value of the elastic movement is 0 mm, and the maximum value of the elastic movement is a pitch. That is, if the entry point of the thread gauge 410 is aligned with the entry point of the to-be-tested nut 101 at the beginning, there is the minimum value. If the entry point of the thread gauge 410 is aligned with the entry point of the to-be-tested nut 101 after the thread gauge 410 is rotated one turn, there is the maximum value.

As shown in FIG. 1, the push rod module 300 may include a push rod driver 310 and a stick 320, the push rod driver 310 drives the stick, and then the stick 320 pushes the to-be-tested nut into the cavity 212 along the sliding rail 220. The push rod driver 310 may be an electric cylinder, a hydraulic cylinder, a pneumatic cylinder or other components with similar functions. The push rod 300 moves back to the front end of the blanking module to prevent the next nut form dropping.

As shown in FIG. 1, the axial pushing module 500 drives the clamping module 200 to move between a first position P1 and a second position P2, the push rod module 200 pushes the to-be-tested nut 101 into the clamping module 200 when the clamping module 200 is at the first position P1, and the thread gauge 419 detects the internal thread of the to-be-tested nut 101 when the clamping module 200 is at the second position P2. The axial pushing module 500 may include a stepping motor 510, a lead screw 520, and a rail 530, the stepping motor 510 drives the lead screw 520, and then the lead screw 520 drives the clamping module 200 to move between the first position P1 and the second position P2. The clamping module 200 is slidably disposed on the rail 530, and the clamping module 200 has a thread cooperating with the lead screw 520. When the stepping motor 510 rotates the lead screw 520 in the forward/reverse direction, the clamping module 200 is driven by the lead screw 520 to move between the first position P1 and the second position P2 along the rail 530. It should be understood that the axial pushing module 500 may be realized by other feasible mechanism designs to drive the clamping module 200 to move between the first position P1 and the second position P2.

After a detection of the to-be-tested nut 101, the push rod module then pushes another to-be-tested nut 102 into the clamping module in response to the clamping module 200 returning to the first position P1, such that another to-be-tested nut 102 pushes off the to-be-tested nut 101 finishing the detection.

In addition, the automatic nut internal thread quality tester 10 further includes: a displacement meter (not shown) for measuring the stroke of the to-be-tested nut 101 into the thread gauge 401, that is, the number of turns of the to-be-tested nut 101 into the thread gauge 401. Please refer to FIG. 6, which is a test result of an automatic nut internal thread quality tester according to the embodiment of the present disclosure. Nuts including three different thread classes (JIS Class I, JIS Class II, and JIS Class III) are detected by using the embodiment of the present disclosure, wherein the accuracy of the JIS Class I is excellent, the accuracy of the JIS Class II is good, and the accuracy of the JIS Class III is poor. As shown in FIG. 6, the nut of JIS Class I has the narrowest distribution range of number of turns under the same torque, and the nut of JIS Class III has the widest distribution range of number of turns (from 2 to 8) under the same torque. In this way, the operator on the production line can quickly and accurately determine the accuracy of the internal thread of nut by the relationship between a certain torque and the number of turns by which the nut is turned into the thread gauge. Furthermore, all nuts can be classified and digitally controlled.

As described above, the thread gauge driving module rotates the thread gauge and measures the torque experienced by the thread gauge, and the axial pushing module cooperates with the clamping module to move the to-be-tested nut, thereby performing a test. When the torque is greater than a threshold value, the thread gauge driving module stops rotating the thread gauge and then reverses to separate the to-be-tested nut from the thread gauge, thereby avoiding the error caused by the difference in the exerted force. In addition, due to the cooperation of the blanking module, the clamping module, and the push module, the feeding and discharging of the nut can be automatically completed.

In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims.

What is claimed is:

1. An automatic nut internal thread quality tester, comprising:

a blanking module configured to accommodate at least one to-be-tested nut;

a clamping module disposed on a side of the blanking module and configured to hold the to-be-tested nut;

a push rod module disposed on another side of the blanking module and configured to push the to-be-tested nut into the clamping module;

a thread gauge driving module disposed opposite the clamping module, wherein the thread gauge driving module comprises a thread gauge, a motor, and a torque sensor, the thread gauge is toward the clamping module, the motor drives the thread gauge to rotate in a first direction, and the torque sensor measures a torque experienced by the thread gauge; and an axial pushing module configured to drive the clamping module, wherein the clamping module is driven to be moved toward the thread gauge in order to make the thread gauge to detect an internal thread of the to-be-tested nut;

wherein in response to the torque measured by the torque sensor being greater than a threshold value, the motor is paused and then the motor drives the thread gauge to rotate in a second direction, and the axial pushing module drives the clamping module away from the thread gauge.

2. The automatic nut internal thread quality tester according to claim 1, wherein the clamping module comprises:

an alignment plate having a cavity, wherein the cavity matches the shape of the to-be-tested nut to accommodate and hold the to-be-tested nut; and a sliding rail disposed on the alignment plate and configured to guide the to-be-tested nut from the blanking module into the cavity.

3. The automatic nut internal thread quality tester according to claim 2, wherein the clamping module further comprises a unidirectional retaining clip disposed between the cavity and the sliding rail, and the unidirectional retaining clip is configured to restrict the to-be-tested nut already in the cavity from moving toward the sliding rail.

4. The automatic nut internal thread quality tester according to claim 3, wherein the unidirectional retaining clip comprises two guiding blocks disposed oppositely, each of the guiding blocks is connected to a spring, and the two guiding blocks only allow the to-be-tested nut enter the cavity.

5. The automatic nut internal thread quality tester according to claim 3, wherein the push rod module comprises a push rod driver and a stick, the push rod driver drives the stick, and then the stick pushes the to-be-tested nut into the cavity along the sliding rail.

6. The automatic nut internal thread quality tester according to claim 2, wherein the clamping module comprises an alignment spring disposed on the alignment plate, and the alignment spring is configured to finely adjust the alignment plate, to guide the to-be-tested nut into the thread gauge.

7. The automatic nut internal thread quality tester according to claim 6, wherein the axial pushing module comprises a stepping motor and a lead screw, the stepping motor drives the lead screw, and then the lead screw drives the clamping module to move between the first position and the second position.

8. The automatic nut internal thread quality tester according to claim 6, wherein after a detection of the to-be-tested nut, the push rod module pushes another to-be-tested nut into the clamping module in response to the clamping module returning to the first position, such that another to-be-tested nut pushes off the to-be-tested nut finishing the detection.

9. The automatic nut internal thread quality tester according to claim 1, wherein the axial pushing module drives the clamping module to move between a first position and a second position, the push rod module pushes the to-be-tested nut into the clamping module in response to the clamping module being at the first position, and the thread gauge detects the internal thread of the to-be-tested nut in response to the clamping module being at the second position.

10. The automatic nut internal thread quality tester according to claim 1, wherein the push rod driver is an electric cylinder, a hydraulic cylinder or a pneumatic cylinder.

* * * * *